INVENTOR.
RICHARD H. FRISCHE
BY
ATTORNEY

United States Patent Office 3,456,508
Patented July 22, 1969

3,456,508
VIBRATING DIAPHRAGM PRESSURE SENSOR APPARATUS
Richard H. Frische, Phoenix, Ariz., assignor to Sperry Rand Corporation, a corporation of Delaware
Filed May 24, 1967, Ser. No. 640,944
Int. Cl. G01l 9/00
U.S. Cl. 73—398      7 Claims

ABSTRACT OF THE DISCLOSURE

A pressure responsive transducer having a vibrating diaphragm for converting pressure directly to frequency based upon the pinciple that a flat diaphragm secured only around its periphery becomes stiffer as it is deformed by pressure loading from its flat or unstressed condition.

BACKGROUND OF THE INVENTION

Field of the invention

The present invention pertains to pressure responsive apparatus for converting pressure directly to electrical signals whose frequency varies as a function of the applied pressure.

Description of the prior art

The prior art pressure responsive transducers generally are unsuitable for applications in digital air data and altitude reporting systems.

Those sensing devices which measure the displacement of a diaphragm in response to pressure are subject to an accumulation of analog errors that will vary due to environmental conditions other than the pressure variations, and their output signals are in the form of an analog voltage or shaft position which must be converted to binary signals for digital application.

Conventional transducers of the type which utilize a vibrating element in the form of a diaphragm usually consider the change in the output signal to be solely a function of pressure whereas in reality the output is a function of the properties of the gas and its density. In one prior art device, the gas pressure to be measured is admitted to both sides of the diaphragm and the output signal is due to the change in damping of the diaphragm allegedly as a function of gas pressure. In its most common usage the diaphragm is driven at a constant amplitude of vibration. As the density of the environment is varied, the amount of air damping changes, thereby causing a change in the energy required to maintain the constant amplitude of vibration. It is this change in driving energy which provides the output signal.

Another prior art transducer utilizes a vibrating wire. The vibrating wire is a force sensing technique in which a potion of the restraining force of the diaphragm is converted to tension in the wire. Therefore, changes in the pressure load on the diaphragm result in changes in the resonant frequency of the vibrating wire, however, it is subject to errors due to temperature and hysteresis.

Still another prior art transducer has a hollow vibating tube which is so constructed that its cross-sectional configuration changes according to changes in the difference between its internal and exterior pressures. The change in cross-sectional configuration is intended to alter its inertial characteristics so that it will have a different natural frequency. However, the output frequency variation is then severely limited over the design pressure range. Further, the construction of the hollow tube is relatively difficult.

SUMMARY OF THE INVENTION

The present invention utilizes a flat diaphragm that is restrained around its circumference and is subjected to pressure differences between one side and the other. In one application where absolute pressure is to be measured, one side of the diaphragm is held at a reference pressure such as a vacuum. Differential pressures may be measured by providing separate pressure ports to each side of the diaphragm. The diaphragm is designed to become stiffer in a non-linear fashion the further it is deformed from its flat or unstressed condition by the pressure of the measured gas acting upon the other side of the diaphragm. The diaphragm deforms easily for the first small increments of pressure applied but as the pressure increases, the additional deformation becomes proportionately less. Considering the diaphragm to be a spring-mass system, it can be driven at a characteristic resonant frequency which is a function of its mass and spring stiffness. As the diaphrgam is deformed more or less by changes in pressure, its stiffness changes and the mechanical resonant frequency changes as a true function of the applied pressure. Thus, the simple, flat diaphragm has the desired property that it is truly a pressure-to-frequency converter suitable for applications in digital air data and altitude reporting systems.

The present invention overcomes the limitations of the prior art transducers by utilizing a simple, flat diaphragm that does not require a vibrating wire associated with it. Further, it measures pressue rather than density with the change in its frequency resulting from a change in the mechanical spring rate of the diaphragm due to pressure loading. In addition, it has an output frequency variation that is substantially greater than prior art devices over the design pressure range of interest for applications in air data and altitude reporting systems.

BRIEF DESCRIPTION OF THE DRAWINGS

Referring now to the drawings.

DESCRIPTION OF THE PREFERRED EMBODIMENT

Figure 1:
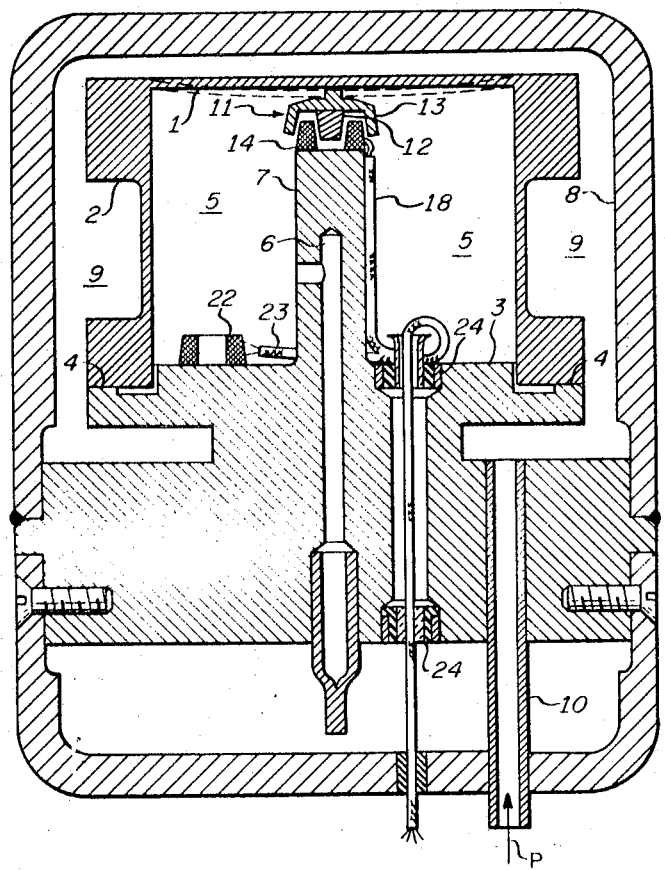
FIG. 1 is a sectional view of a vibrating diaphragm pressure sensor depicted as an absolute pressure sensor, constructed in accordance with the present invention.

Referring now to FIG. 1, the present invention includes a circular, flat, resilient, metallic diaphragm 1 welded around its periphery to, or fabricated as part of, a hollow tubular supporting structure 2. The supporting structure 2 is mounted on a base member 3 in air-tight fashion by means of seals 4 to define a first air-tight cavity 5. The cavity 5 may be evacuated by an evacuation tube 6 which extends through the base member 3 and partially through a cylindrical pedestal 7 to communicate with the cavity 5. After evacuating the cavity 5, the extremity of the tube 6 projecting exteriorly of the base 3 is sealed to provide a reference vacuum within the cavity 5 on one side of the diaphragm 1. A hollow tubular cover 8 is secured in air-tight fashion to the base 3 to define a second air-tight cavity 9. A pressure tube 10 extends through the base 3 and communicates with the cavity 9 to provide the air pressure P to be measured to the other side of the diaphragm 1.

As pressure is admitted to the cavity 9 via the tube 10, the diaphragm 1 is bent or deformed (as shown in dotted lines) becoming stiffer as it is deflected from its flat or unstressed condition shown in solid lines. It is this property of varying stiffness that causes the mechanical resonant frequency of the pressure sensor of the present invention to vary with the pressure applied.

Figure 2:
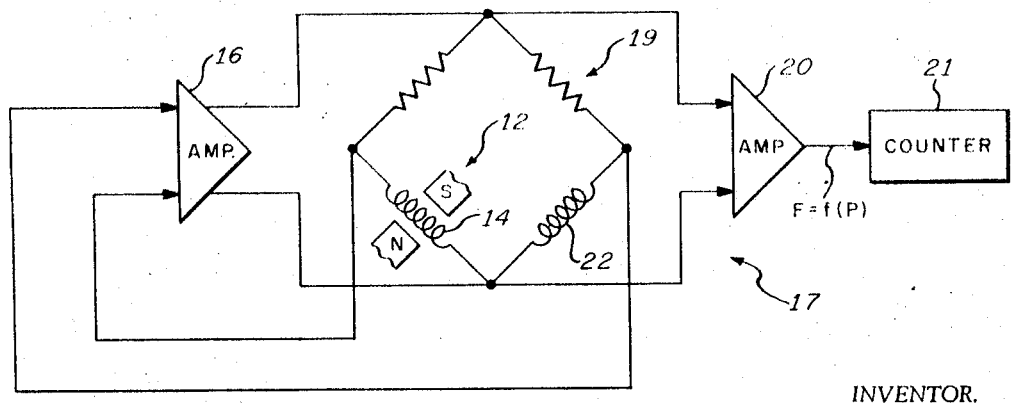
FIG. 2 is an electrical schematic wiring diagram, partly in block form, showing the present invention including the electromechanical oscillator circuit.

A coil and magnet assembly 11 may be used to apply a driving force to the diaphragm 1. A small cylindrical permanent magnet 12 is attached by means of a circular magnet housing 13 to the center of the diaphragm 1 for movement therewith within the cavity 5. A driving and sensing coil 14 is mounted on the extremity of the pedestal 7 in cooperative coaxial relation with the magnet 12 and the magnet housing 13. By applying a variable electrical signal to the coil 14, the diaphragm 1 will vibrate at the driving frequency. The transducer response will reach a resonant peak when the driving frequency is equal to the mechanical resonant frequency of the diaphragm, as determined by the applied pressure via tube 10. It is therefore possible to connect the driving and sensing coil 14 in a feedback circuit as shown in FIG. 2, such that the "back EMF" generated as the magnet 12 moves with respect to the coil 14 is connected back to the input of a driving amplifier 16. In this configuration, the closed loop sensor and amplifier circuit 17 will oscillate at the electromechanical resonant frequency of the system, and the frequency of oscillation will change as a function of the pressure across the diaphragm 1. The terminals of the coil 14 are connected via leads 18 through glass seal 24 in the base 3 to a bridge circuit 19. The output of the bridge circuit 19 is connected to the input of the amplifier 16 in order to amplify the back EMF signal and apply it to the coil 14 as a driving signal via the bridge circuit 19. In this way, the closed loop circuit 17 operates as a self-resonant electromechanical oscillator which oscillates at the resonant frequency of the diaphragm 1. The output of the amplifier 16 is further amplified by an output amplifier 20 to provide an amplified signal whose frequency is a function of pressure to a utilization circuit such as a counter 21.

In order to maintain the bridge circuit 19 accurately balanced, the coil 22 which forms another leg of the bridge circuit 19 may also be disposed in the cavity 5 and thereby subjected to the same environment as the coil 14. The terminals of the coils 22 may be similarly connected via leads 23 through the glass seals 24 to the bridge circuit 19.

The principle of operation of the vibrating diaphragm pressure sensor of the present invention, based upon the basic non-linear characteristics of a flat, clamped, resilient diaphragm, may also be explained mathematically. A flat diaphragm becomes stiffer as its deflection increases, and it is this change in stiffness or "spring rate" which causes the resonant frequency to change as a function of deflection. The diaphragm may be driven by means of an electromechanical oscillator, for example, using the diaphragm as the resonant element or in other ways to be explained subsequently. In the derivation which follows, it is assumed, for the purpose of obtaining resonant characteristics, that the amplitude of vibration is small in relation to the diaphragm thickness in order that the problem can be treated as a linear spring mass system and utilize the following standard differential equation:

$$M\ddot{\delta} + \rho\dot{\delta} + k_f\delta = F_o \cos \omega t$$

where:

$M = m_e + m_m =$ effective mass of diaphragm plus mass of magnet assembly
$\rho =$ damping coefficient
$k_f =$ force spring rate
$F_o = BIL =$ peak value of driving force
$\delta =$ vibration deflection at center
$B =$ magnetic flux density
$L =$ wire length
$I =$ driving current $$\delta(t) = \frac{F_o/k_f}{\left[\left(\frac{\omega^2}{\omega_o^2} - 1\right)^2 + \left(2\frac{\rho}{\rho_c}\frac{\omega}{\omega_o}\right)^2\right]^{1/2}} \times \cos(\omega t - \psi)$$

and $$\psi = \tan^{-1} \frac{2\frac{\rho}{\rho_c}\frac{\omega}{\omega_o}}{1 - \frac{\omega^2}{\omega_o^2}}$$

Where $\omega_o$ is the undamped natural frequency of the system, and $\rho_c$ is the coefficient for critical damping. The velocity expression is $$\dot{\delta}(t) = \frac{-F_o/k_f \times \omega \sin(\omega t - \psi)}{\left[\left(\frac{\omega^2}{\omega_o^2} - 1\right) + \left(2\frac{\rho}{\rho_c}\frac{\omega}{\omega_o}\right)^2\right]^{1/2}}$$

From the displacement and velocity expressions it is seen that $$\delta(t) = -\frac{\dot{\delta}(t)}{\omega} \cot(\omega t - \psi)$$

The current ($i$) generated in the sensor by the relative movement of the coil and the magnetic field is $$i = \frac{BL}{R}\dot{\delta}(t)$$

where R is the coil resistance. If this value is substituted into the expression for the diaphragm displacement, $\delta$, we get $$\delta(t) = -\frac{iR}{BL\omega} \cot(\omega t - \psi)$$

or $$\delta_o = +\frac{i_o R}{BL\omega} \cot(+\psi)$$

(zero subscripts indicate peak values).

To predict the resonant frequency of the pressure-loaded diaphragm, the separate theories for both small and large displacement must be combined. In small displacement theory, the shear and bending strain in the diaphragm is required to support the pressure load, while in large displacement theory it is the tensile strain of the diaphragm which supports the load. In the combined theory, the load is considered as the sum of two partial pressures.

The expression $$P_1 = \frac{16Eh^3}{3(1-\gamma^2)b^4}$$

represents the conditions for bending strains (small displacement), while the expression $$P_2 = \frac{Eh\delta'^3}{(0.662)^3 b^4}$$

represents the condition for tensile strain (large displacements). The total combined loading is thus expressed by $$P = P_1 + P_2 = \frac{Eh^3\delta'}{b^4}\left[\frac{16}{3(1-\gamma^2)} + \frac{1}{(0.662)^3}\frac{\delta^2}{h^2}\right]$$

where:

$b =$ the radius of the diaphragm
$h =$ the thickness of the diaphragm
$P =$ the pressure load acting on the diaphragm
$E =$ Young's Modulus of the diaphragm material
$\gamma =$ Poisson's ratio for the diaphragm material The pressure spring rate of the diaphragm can be found from the derivative of the above equation $$k_p = \frac{dP}{d\delta'} = \frac{Eh^3}{b^4}\left(\frac{16}{3(1-\gamma^2)} + \frac{3\delta'^2}{(0.662)^3 h^2}\right)$$

$$k_f = k_p A_e$$

where $A_e$ is the effective area of the diaphragm. For very small displacements, $$A_e = \frac{\pi b^2}{4}$$

$$k_t = \frac{\pi E h^3}{b^2}\left(\frac{4}{3(1-\gamma^2)} + \frac{3}{4(0.662)^3}\frac{\delta'^2}{h^2}\right)$$

This equation describes the effect of displacement on the spring rate. It is this variation in spring rate which is responsible for the change in resonant frequency with change in pressure load. The undamped natural frequency of the linear system is $$f = \frac{1}{2\pi}\sqrt{\frac{k_f}{M}}$$

if $$M = \frac{1}{4}\pi b^2 h \rho + M_m$$

then $$f = \frac{1}{\pi b}\left[\frac{\pi E h^3\left(\frac{4}{3(1-\gamma^2)} + \frac{3}{4(0.662)^3}\frac{\delta'^2}{h^2}\right)}{\pi b^2 h \rho + 4 M_m}\right]^{1/2}$$

This equation, together with the equation for pressure as a function of displacement describes the pressure vs. frequency function of the vibrating diaphragm pressure sensor.

Figure 3:
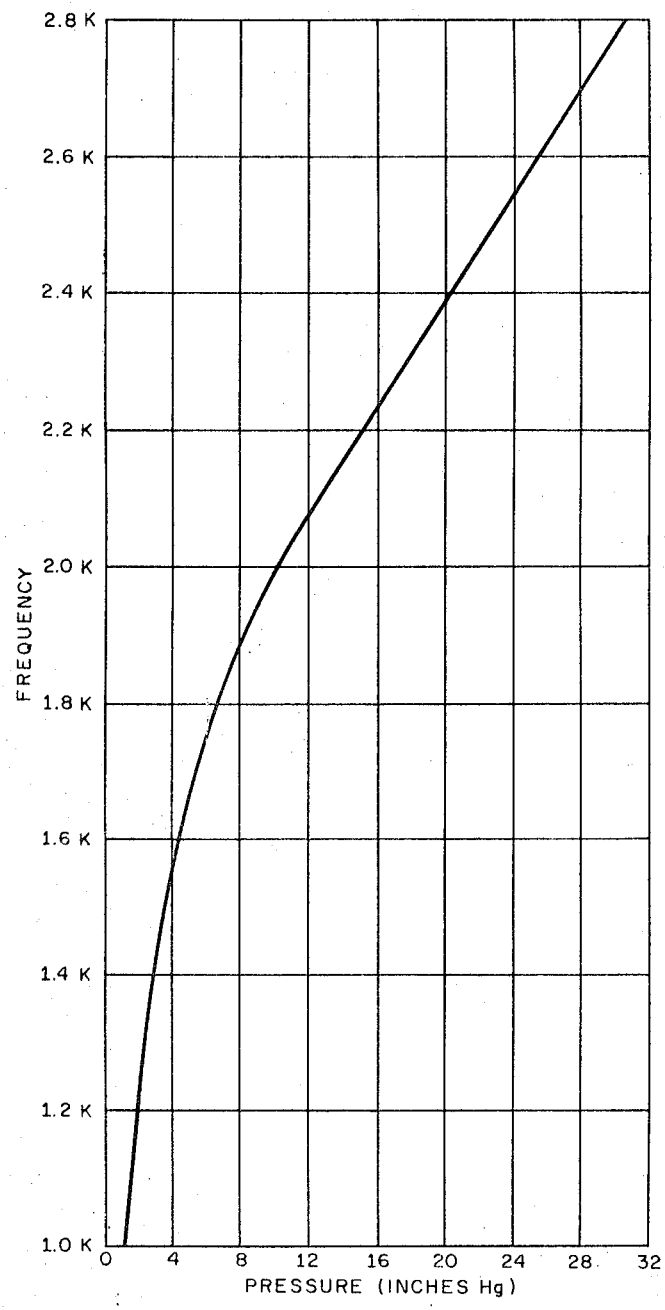
FIG. 3 is a typical graph of frequency versus pressure measured taken in accordance with the present invention.

From a design point of view, the diaphragm material is selected with primary emphasis on minimum hysteresis characteristics. To achieve the desired characteristics, a diaphragm material is chosen to have the property of minimum coefficient of internal friction. Size and frequency range considerations, as well as the aforementioned, resulted in the selection of a beryllium copper diaphragm one inch diameter and .005" thick to achieve the results shown in the graph of FIG. 3. A constant Young's modulus alloy such as Ni-Span C may also be used for diaphragm construction, and it will also have an output function similar to that of beryllium copper. Use of such a material greatly reduces errors due to temperature sensitivity.

The present invention has been described with respect to a magnet moving with the diaphragm and cooperative with a fixed coil. It will be appreciated however that other possible techniques for driving and detecting the resonant motion of the diaphragm may include: (1) a moving coil and fixed magnet similar to that shown in U.S. Patent No. 2,764,019 entitled Vibration Measuring Device of Linkholm et al., issued Sept. 25, 1956, (2) electrostatic driving with variable capacity detection, (3) moving armature techniques, and (4) piezoelectric techniques.

While the invention has been described in its preferred embodiment, it is to be understood that the words which have been used are words of description rather than limitation and that changes may be made without departing from the true scope and spirit of the invention in its broader aspects.

I claim:

1. Pressure measuring apparatus comprising:
   means defining an enclosure, means including a diaphragm fixedly secured at its peripheral edge portions and disposed within said enclosure to subdivide said enclosure into two compartments, one adapted to receive one fluid pressure and the other another fluid pressure,
   said diaphragm being of such thinness, free surface area and resiliency that its resonant frequency will change in accordance with changes in differential fluid pressures acting thereon,
   electrical driving means associated with said diaphragm for vibrating said diaphragm,
   a variable frequency oscillator connected with said driving means,
   said driving means being connected to form in part the tuning circuit for said oscillator and to receive the current output of said oscillator in closed loop fashion,
   whereby the diaphragm will be driven at a frequency corresponding to its resonant frequency for the existing differential pressure and the output frequencies of said oscillator will be measures of fluid pressures.

2. Pressure measuring apparatus of the character recited in claim 1 in which said driving means is connected to form part of a bridge tuning circuit for said oscillator.

3. Pressure measuring apparatus of the character recited in claim 1 in which the electrical driving means comprises a permanent magnet armature and a driving coil, one being mounted to move with the diaphragm and the other being fixedly positioned in cooperative relation thereto.

4. Pressure measuring apparatus of the character recited in claim 3 in which the coil of said driving means is connected in one leg of a bridge tuning circuit for said oscillator and to be excited from the oscillator output.

5. Pressure measuring apparatus of the character recited in claim 3 together with a second coil disposed within said enclosure and subjected to the same ambient conditions as said driving coil, said coils being connected in respective legs of a bridge circuit forming the tuning circuit for said oscillator.

6. Pressure measuring apparatus of the character recited in claim 1 in which the diaphragm is formed of a metal having low internal friction and low mechanical hysteresis characteristics.

7. Pressure measuring apparatus of the character recited in claim 1 in which said diaphragm comprises a thin, flat and smooth, resilient metal plate of such free surface area and stiffness that is resonant frequency will detectably change with changes in differential fluid pressures acting thereon of the order of magnitude experienced in atmospheric pressure measurements.

References Cited

UNITED STATES PATENTS

| 2,891,159 | 6/1959 | Politi et al. | 331—65 XR |
| 3,019,397 | 1/1962 | Cosby | 331—65 |
| 3,127,571 | 3/1964 | Crowcroft | 331—65 XR |
| 3,140,450 | 7/1964 | Tavis | 331—65 XR |
| 3,290,922 | 12/1966 | Thompson | 73—69 XR |

LOUIS R. PRINCE, Primary Examiner

D. O. WOODIEL, Assistant Examiner

U.S. Cl. X.R.

73—393, 406

UNITED STATES PATENT OFFICE
CERTIFICATE OF CORRECTION

Patent No. 3,456,508                                          July 22, 1969

Richard H. Frische

It is certified that error appears in the above identified patent and that said Letters Patent are hereby corrected as shown below:

Column 1, line 57, "potion" should read -- portion --. Column 2, line 29, "pressue" should read -- pressure --. Column 4, line 50, "$Eh^3$" should read -- $Eh^3\delta'$ --; line 60, "$\delta 2$" should read -- $\dfrac{\delta'2}{h^2}$ --. Column 4, line 68, insert -- $\delta' = $ deflection at center due to P --.

Signed and sealed this 15th day of December 1970.

(SEAL)
Attest:

Edward M. Fletcher, Jr.                          WILLIAM E. SCHUYLER, JR.
Attesting Officer                                         Commissioner of Patents